March 1, 1938. F. H. LOFTUS 2,109,542
CONSTRUCTION AND OPERATION OF REGENERATORS
Filed Nov. 27, 1936 2 Sheets—Sheet 2
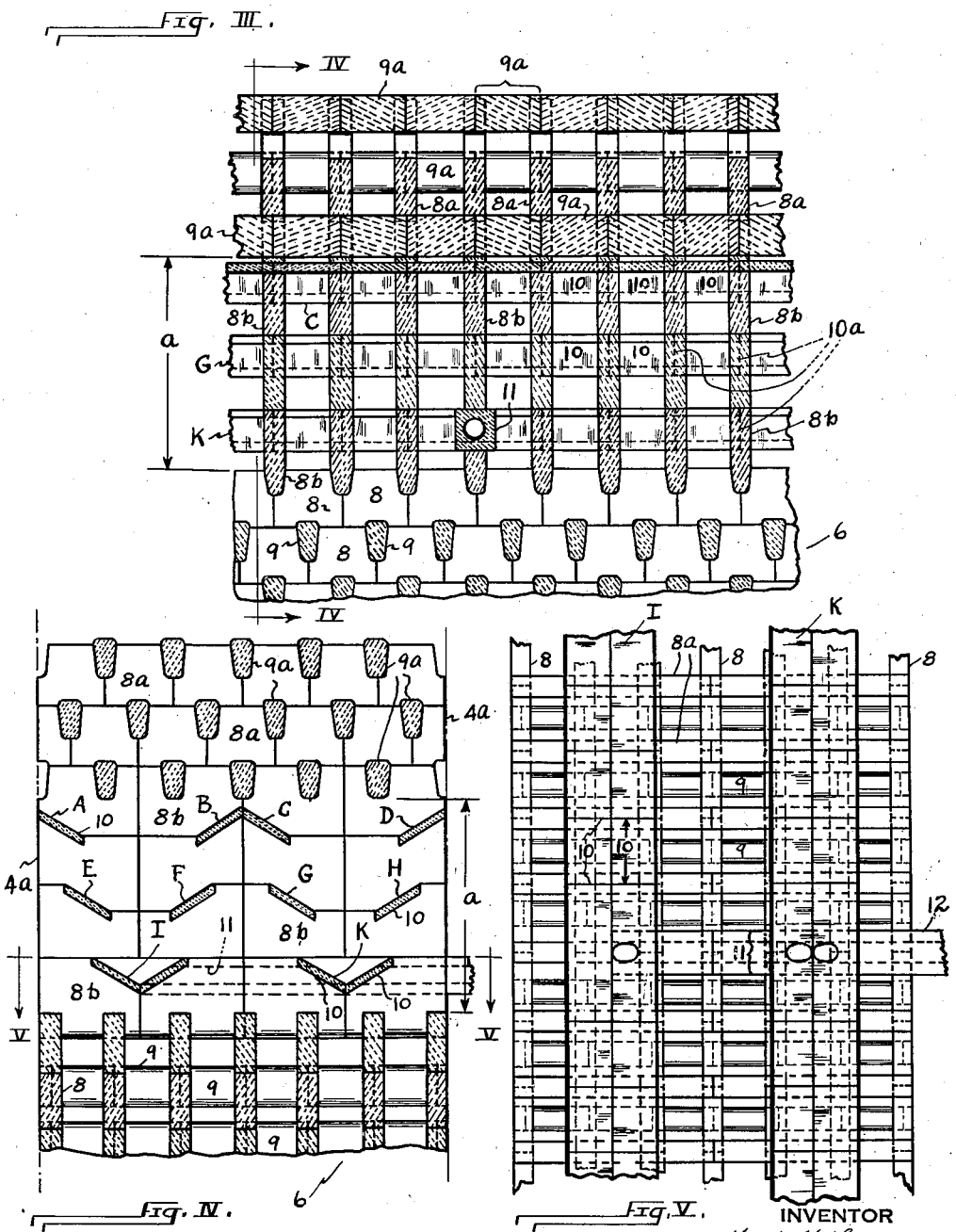
INVENTOR
Fred H. Loftus
BY Christy and Wharton
ATTORNEYS

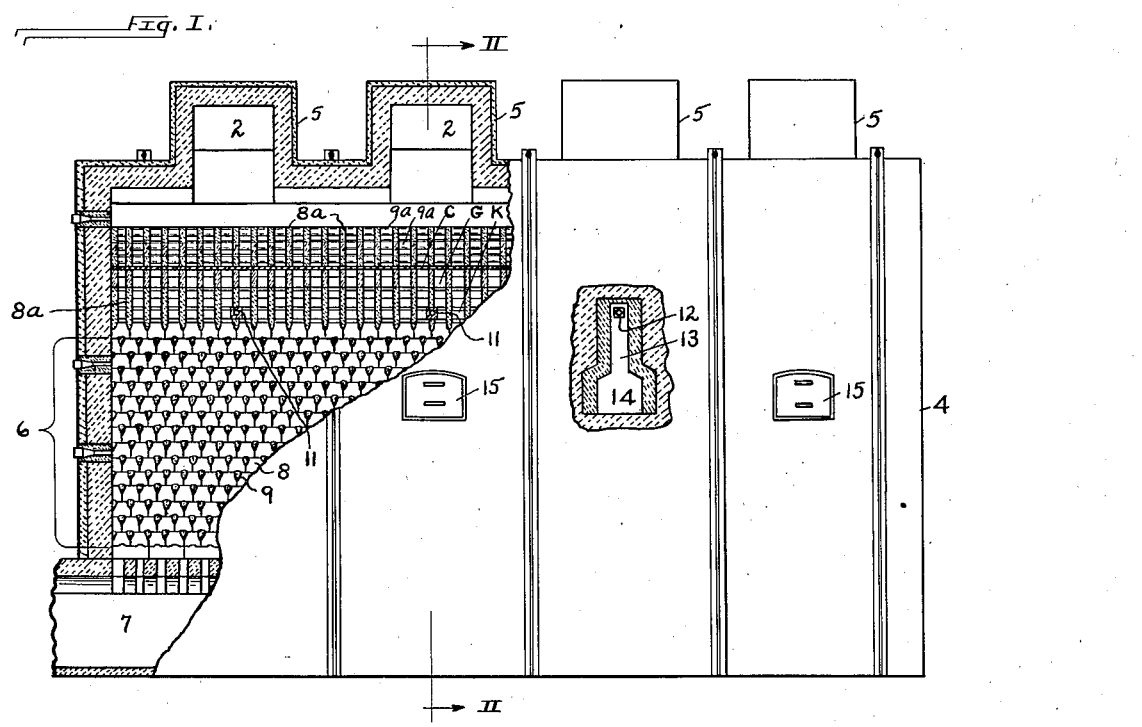
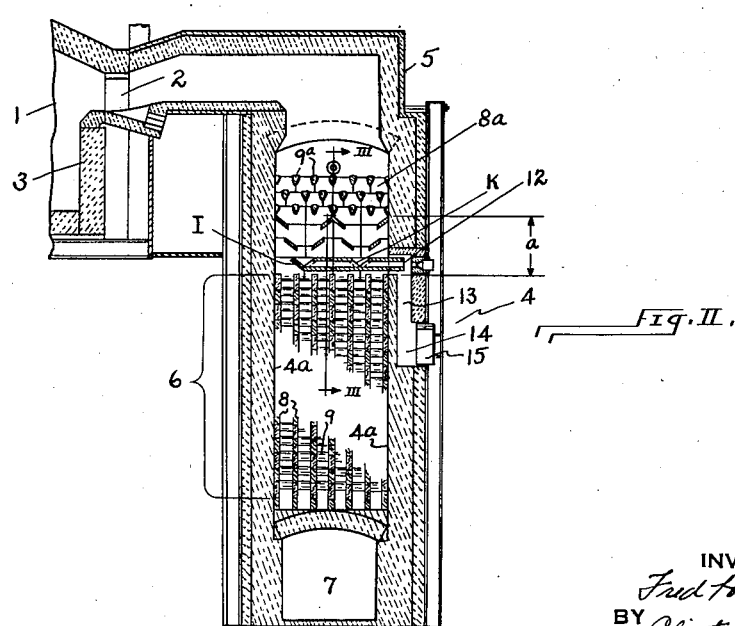

Patented Mar. 1, 1938

2,109,542

UNITED STATES PATENT OFFICE 2,109,542

CONSTRUCTION AND OPERATION OF REGENERATORS

Fred H. Loftus, Mount Lebanon, Pa.

Application November 27, 1936, Serial No. 112,872

7 Claims. (Cl. 263—19)

My invention relates to regenerative furnaces, and particularly to regenerators for use with glass furnaces.

Usually glass manufacturers endeavor to obtain the largest possible production of glass per unit of hearth area of their furnaces or tanks. It is known that higher furnace temperatures give greater production, but the problem is not as simple as this fact might indicate: Higher furnace temperatures require regenerators of higher capacity, and it is in the provision and operation of high-capacity regenerators that difficulties arise.

A high-capacity regenerator will be understood to be a regenerator which in service is adapted to preheat the air for combustion within a furnace to 2000° F. or more, and it will be understood that, in order to obtain such performance, it is necessary to build the checkerwork much deeper than in the usual regenerator, and to position the checkerwork with its top much nearer to the ports of the furnace. In such an organization the usual long connecting flues extending from the furnace ports to the regenerators are eliminated, with the consequence and effect that heat losses are decreased; the waste gases of the furnace are delivered at higher temperature to the regenerator organized with the outgo ports of the furnace; a higher degree of preheat is given to the combustion-sustaining air flowing to the firing ports from the air-preheating regenerator; the operating temperature of the furnace is raised; and a much lower fuel consumption is realized. Notwithstanding these recognized advantages, high-capacity regenerators have proved unsatisfactory in service for the following reasons.

In a glass furnace the burning gases and hot products of combustion, in sweeping over the furnace hearth, pick up and entrain (in the form of vapors and molten particles) an appreciable quantity of material from the molten batch. Such products of combustion or waste gases carry these vapors and molten particles into the regenerator (or regenerators) at the outgo ports of the furnace, and, as the gases come into contact with the relatively cool upper walls and checkerwork of the regenerator, the entrained vapors condense, forming a molten fluid that drips and drains downward through the regenerator.

In operating such furnaces with high-capacity regenerators, regenerators having relatively deep checkerwork, it was found that the temperature at the bottom of the checkerwork was lower than the freezing temperature of this condensate. Thus, the condensate draining from the relatively hot upper portion of the checkerwork solidified in the form of a hard glass-like material in the lower portion of the checkerwork. In a relatively short time the progressively draining and solidifying material reached such proportions that the gas passageways of the checkerwork became clogged and constricted, necessitating that the furnace be shut down and the solidified material cracked-out and removed. This condition so far handicapped efficiency that in most cases the furnace operators returned to the use of low-capacity regenerators.

It may be remarked that the checkerwork of a low-capacity regenerator is of substantially less depth than the checkerwork of a high-capacity regenerator, and the result is that in service the temperature at the bottom of the checkerwork is above the solidifying temperature of the molten condensate. Thus, the condensate remains fluid, drains through the checkerwork, and runs to the bottom of the regenerator, whence it may be readily removed. Of course, in the operation of low-capacity regenerators the waste gases leave the checkerwork at relatively high temperature, whereby a relatively great quantity of available heat is lost. And it goes without saying that such regenerators as these do not admit of the desired high production in the furnaces in which they are embodied.

With this general situation in mind, it will be understood that my invention consists in refinements and elaborations in regenerator construction and in method of operation, by virtue of which it becomes not only practical but exceedingly advantageous to employ high-capacity regenerators.

In the accompanying drawings Fig. I is a view, partly in side elevation and partly in vertical section, of a regenerator in which and in the operation of which the invention is realized; Fig. II is a view of the regenerator in vertical section, the plane of section being indicated at II—II in Fig. I; Fig. III is a fragmentary view, showing the internal construction of the regenerator to larger scale and in section on the plane III—III of Fig. II; Fig. IV is a sectional view on the plane IV—IV of Fig. III; and Fig. V is a view on the plane V—V of Fig. IV.

Referring to Fig. II of the drawings a furnace 1 is fragmentarily indicated. In exemplary way the furnace 1 is shown to be a side-fired furnace, including four ports 2 opening through each of its opposite side walls 3. (Only one of the furnace side walls is shown in the drawings, and it appears in Fig. II.) A regenerator 4 is built at each side of the furnace, and the four ports 2 on each side communicate immediately with the top of the adjacent regenerator, by way of short necks 5. Each regenerator includes a body of checkerwork 6, and from beneath the checkerwork a passage 7 extends through the end wall of the regenerator to the usual reversing valves that in known way are operable to establish communication with either the air inlet of the furnace or the stack. The reversing valves, air inlet and stack are not shown in the drawings— their structure and organization are matters with which the art is familiar. The art is also familiar with the manner in which regenerative furnaces are operated, and suffice it herein to say that the checkerwork of the regenerator on one side of the furnace absorbs heat from the hot waste gases on their way from furnace to stack, while the already heated checkerwork of the other regenerator gives up heat to the air for combustion on its way into the furnace. From time to time the furnace is reversed and the functions of the two regenerators are alternated.

Each of the regenerators is of relatively great vertical extent, permitting the included body of checkerwork 6 to be of relatively great depth. The checkerwork consists in an open-work structure, built of heat-exchange units, such as blocks of refractory material adapted to receive and store substantial quantities of heat. In this case the checkerwork is constructed of refractory tiles 8 laid up in spaced-apart parallel walls and interconnected by refractory blocks 9, as described in Patent No. 1,686,826, granted to me on October 9, 1928.

For present purposes the furnace 1 will be considered to be operating with the ports 2 shown in the drawings serving as the outgo ports. The hot waste gases of the furnace enter the regenerator above the checkerwork, and, passing into the channels between the vertical walls of tile 8, they flow downward in serpentine and tortuous paths between the staggered checker blocks 9. As they so flow, the gases yield heat to the refractory bodies 8, 9 that form the checkerwork, and, as the operation of the furnace continues, great quantities of heat are transferred to and stored in the checkerwork. The checkerwork delivers the gases into the passage 7 below, whence they flow at reduced temperature and velocity to the usual furnace stack.

As has been already mentioned, the hot waste gases of the furnace carry vapors and molten particles from the batch (and from the fluxed surfaces of the refractory walls) within the furnace. In accordance with my invention, the vapors entrained in the waste gases streaming from the furnace are condensed, and the resulting condensate is precipitated, together with the molten particles included in the hot gases. Then the precipitated material is collected, and, while maintained at a temperature above its solidifying temperature, is run or conducted into an outlet or receiver.

This elimination of vapors and molten particles from the waste gases of the furnace is effected in the top of the regenerator 4, above the gas-receiving end or top of the body 6 of checkerwork, and it will be understood that the gases are thoroughly cleansed of molten inclusions before they enter the checkerwork. Accordingly, the high-capacity regenerator 4 may be operated with the lower regions of its relatively deep checkerwork 6 at temperatures below the solidifying temperature of the molten inclusions in the gases leaving the furnace, without danger of the passageways of the checkerwork soon becoming clogged. A low temperature at the bottom of the checkerwork normally means that the waste gases leave the regenerator at a correspondingly low temperature, and, under normal conditions of operation, the lower the temperature of the waste gases leaving the checkerwork the greater the thermal efficiency of the regenerator and furnace.

Returning to Figs. I and II of the drawings, the particularly effective means I have provided for conducting the above-described method will be considered. It will be noted that above the main body 6 of checkerwork in the regenerator I construct a plurality of equispaced, parallel walls of refractory tiles 8a and 8b. These walls (8a, 8b) are vertical and extend transversely of the regenerator chamber, whereas the vertical tile walls (8) of the main body 6 of checkerwork extend longitudinally of such chamber. The walls of tile 8a, 8b are approximately one-half the height of the main walls of tile 8.

In the intervals between the successive walls 8a, 8b several courses (three courses in this case) of checker blocks 9a extend, reference again being made to my patent, above noted. The blocks 9a are staggered vertically, as may be perceived in Figs. II and IV, and as a group the three courses of such blocks are arranged an interval a above the top of the main body 6 of checkerwork. The tiles 8a and blocks 9a provide an auxiliary checkerwork upon which the hot gases streaming from the furnace impinge. The temperature of this so-called auxiliary checkerwork is, of course, lower than the temperature of the waste gases, and the impinging and flowing of the hot gases against the relatively cool tiles and blocks of this auxiliary checkerwork causes condensation and partial precipitation of the vapors included in the gases. Thus, it will be understood that the auxiliary checkerwork 8a, 9a comprises a condenser for the vapors in the waste gases, and the region occupied by such checkerwork may properly be termed a condenser zone.

In the interval a between the main body 6 of checkerwork and the so-called condenser checkerwork 8a, 9a, means are provided for completing the precipitation of the condensate and for separating the precipitated condensate and other included molten particles from the hot gases. Such means consist in a plurality of plates or slabs 10 of high grade refractory material. The slabs 10 are of rectangular form, and in this case the slabs are of such length as to span the center-to-center interval between the equispaced walls of tile 8a, 8b. The tiles 8b are so transversely recessed within their meeting edges that the slabs 10 may be aligned end to end, with their ends (cf. 10a in Fig. III) abutting and secured within the bodies of the successive walls 8a, 8b, in the following arrangement.

Immediately below the lower course of checker blocks 9a of the condenser checkerwork 8a, 9a, four parallel lines of slabs 10 are mounted in the tiles 8b, providing, as may be visualized in Figs. III and IV, four horizontally spaced-apart, laterally inclined baffles A, B, C and D that extend from one end of the regenerator to the other. The baffles A and C are inclined oppositely to the baffles B and D; the two outer baffles A and D are arranged with their upper or outer edges severally engaging the opposite side walls 4a of the regenerator, while the two intermediate baffles B and C are arranged with their upper edges in mutual contact, as shown in Fig. IV. At an interval below the baffles A, B, C and D four secondary lines of slabs 10 are arranged to provide a second stage of inclined baffles E, F, G and H which also extend in continuity from one end of the regenerator to the other. And beneath this second course of baffles, two troughs I and K are provided. Each trough may be, and in this case is, constructed of refractory slabs, such as the slabs 10 used in constructing the baffles A to H; the slabs are laid end to end in pairs, providing an open V-shaped channel or duct that extends from one end wall of the regenerator to the other.

The two troughs I and K are interconnected at intervals longitudinally of the regenerator, by means of tubes 11 of refractory material, and from the trough K spouts 12 extend laterally, one in axial alignment with each of the tubes 11. The spouts 12 severally project into passages 13 that open downward into pockets 14 built in the side wall of the regenerator, and each pocket 14 is provided with a removable closure 15. As will presently appear, the pockets 14 comprise outlets or receivers for the molten material scavenged from the waste gases of the furnace. In this case the troughs I and K are interconnected at four points—a tube 11, spout 12, and pocket 15 being installed on the vertical midplane of each of the four ports 2, as may be visualized in Fig. I.

Again turning to Fig. IV, it will be understood that the hot waste gases, passing from the ports of the furnace and streaming downward through the relatively narrow passages between the tiles and blocks of the condenser checkerwork 8a, 9a, flow in meandering streams between the baffles and troughs A to K, inclusive. In the upper stage of baffles the intervals between baffles A and B, and C and D, are relatively wide, whereas the intervals between the baffles E, F, G, H of the second stage, and between the opposite side walls of the regenerator and the baffles E and H, are relatively narrow. By virtue of such baffle arrangement, the velocity of the flowing gases is alternately decreased and increased, and sharp changes are effected in the direction of flow. Under such conditions of flow, the vapors and molten particles remaining in the gases, as they leave the checker-work 8a, 9a, are condensed and precipitated upon the surfaces of the baffles. The molten precipitate initially yielded by the gases to the upper walls of the regenerator and to the surfaces of the condenser checkerwork 8a, 9a drips upon the baffles.

This dripping molten material, together with the molten precipitate deposited immediately upon the baffles, drains from the baffles into the troughs I and K, it being noted that the edges of the baffles and troughs overlap in such manner that all drainage of the precipitated material eventually reaches and is collected in the two troughs. The molten material accumulating in trough I flows through tubes 11 into trough K, whence it flows, together with the accumulations in trough K through spouts 12 and passages 13 into the outlets or receivers 14. Thus, the objectionable vapors and molten particles are scavenged from the waste gases of the furnace on their way into the main checkerwork 6 of the regenerator.

From time to time, the closures 15 are removed from the side wall of the regenerator, and the material accumulated in the pockets 14 removed. In a practical application of the invention, it was found that by operating the checkerwork 8a, 9a at a temperature of from 2450° F. to 2500° F. the baffles A to H and the trough system I, K, 11, 12 were maintained at a temperature above the solidifying temperature of the molten precipitate. It was also found that under these conditions the molten material removed from the gases was very fluid or mobile, and that the trough system operated very effectively in conducting such fluid material, in streams running transversely to the general direction of flow of the gases, to the receiving pockets 14. By virtue of my invention a furnace can be operated over an extended period without interruption.

I have not prolonged this specification with details of construction which the engineer can supply. However, I may say in passing that the regenerator 4 is constructed of refractory masonry, reinforced and tied with structural steel and tie-rods in usual way. The heat-exchanging units—the tiles 8 and blocks 9—of the main body 6 of checkerwork are formed of first quality fire-brick clay. The tiles 8a, 8b, and blocks 9a are constructed of either a 60% or 70% alumina refractory material, while the baffle and trough elements 10, 11 and 12 are formed of sillimanite. These refractory materials are well known in the art.

Whereas the baffles A to H and troughs I, K are shown extending longitudinally of the regenerator, it will be understood that they may be arranged to extend in transverse direction. That is to say, the tile walls 8a, 8b may extend longitudinally of the regenerator, whereby the baffles and troughs may be mounted to extend from one side wall of the regenerator to the other. In such manner a great many short baffles and troughs may be used in place of the few relatively long baffles and troughs shown. The short troughs of the modified structure will of course be arranged to discharge the accumulated molten material into a relatively small number of receivers or pockets; indeed, it may be practical in some cases to provide a single pocket to receive all the molten material scavenged from the gases. It is deemed unnecessary to deal specifically with the many other variations and modifications which will occur to the engineer.

I have described the invention as it is embodied in glass furnaces, but it is to be understood that in the appended claims I do not limit the invention to such furnaces. It is contemplated that advantages may be realized from the practice of the invention in the open-hearth furnaces of steel mills, and in other sorts of regenerative furnaces in which the waste gases are laden with molten particles or condensable vapors. And it is manifest that the principles of the invention may be embodied in heat-exchangers other than regenerators.

I claim as my invention:

1. A regenerator including a main body of checkerwork adapted to receive and deliver the hot waste gases of a furnace, an auxiliary body of checkerwork arranged above said main body of checkerwork for condensing vapors included in the gases on their way into said main body of checkerwork, and means arranged between said bodies of checkerwork for removing the condensate from the flowing gases.

2. A regenerator including two passes of checkerwork arranged in series and adapted to receive hot waste gases including vapors and molten particles of slag, said first pass of checkerwork operating primarily as a condenser for the vapors in said gases, said second pass serving primarily to store heat yielded by the gases, and means arranged between said passes for removing the condensed vapors, together with said particles of slag, from the gases flowing from said first pass to the second.

3. A regenerator including a checkerwork chamber, said chamber including a body of checkerwork adapted to receive and deliver waste gases, a duct, and a system of vertically and laterally spaced-apart inclined baffles arranged adjacent to the top of said body of checkerwork in the line of flow of said gases and adapted to arrest particles included in the waste gases, as described, and to direct the arrested particles into said duct.

4. The structure of the next-preceding claim, in which an auxiliary body of checkerwork is arranged above said system or baffles and duct for condensing vapors included in said gases, as described.

5. The herein described method of operating a regenerative furnace, which method comprises leading the hot vapor laden gases of the furnace first through an auxiliary body of refractory checkerwork and effecting condensation of the vapors in such gases, then leading the gases in divided and meandering stream downwards through a main body of refractory checkerwork and causing the gases to yield stores of heat thereto, and separating and removing the condensate from the gases in the course of their travel between said bodies of checkerwork.

6. A regenerator adapted to receive from a furnace waste gases laden with vapor, condensate, and molten particles of slag, and to deliver the gases to an outlet; said regenerator including a body of checkerwork through which said gases flow in downward direction, and means arranged adjacent to the top of said body of checkerwork for removing condensate and particles from the gases, said means including a duct and a plurality of members vertically and laterally spaced apart and adapted to arrest molten particles included in said waste gases and to direct such arrested particles into said duct.

7. A regenerator adapted to receive from a furnace waste gases laden with vapor, condensate, and molten particles of slag, and to deliver the gases to an outlet; said regenerator including a body of checkerwork adapted to receive and deliver said waste gases, and means for removing condensate and particles from the gases on their way into said body of checkerwork, said means including a duct and a plurality of members vertically and laterally spaced apart and adapted to arrest particles included in said gases and to direct the arrested particles into said duct.

FRED H. LOFTUS.